US012089673B2

(12) United States Patent
Smith

(10) Patent No.: US 12,089,673 B2
(45) Date of Patent: Sep. 17, 2024

(54) METHODS AND APPARATUS FOR A SOUND REDUCING MASK

(71) Applicant: Justin Smith, Wittmann, AZ (US)

(72) Inventor: Justin Smith, Wittmann, AZ (US)

(*) Notice: Subject to any disclaimer, the term of this patent is extended or adjusted under 35 U.S.C. 154(b) by 259 days.

(21) Appl. No.: 17/865,561

(22) Filed: Jul. 15, 2022

(65) Prior Publication Data

US 2023/0068774 A1 Mar. 2, 2023

Related U.S. Application Data

(60) Provisional application No. 63/237,817, filed on Aug. 27, 2021.

(51) Int. Cl.
*A41D 31/04* (2019.01)
*A41D 13/11* (2006.01)
*G10K 11/162* (2006.01)

(52) U.S. Cl.
CPC .......... *A41D 31/04* (2019.02); *A41D 13/1161* (2013.01); *G10K 11/162* (2013.01)

(58) Field of Classification Search
CPC ... A41D 13/1161; A41D 13/11; G10K 11/162
See application file for complete search history.

(56) References Cited

U.S. PATENT DOCUMENTS 2,508,581 A * 5/1950 Morrow ................. H04R 1/083 381/189
2,572,547 A * 10/1951 Webb ..................... H04R 1/083 181/242
3,438,370 A * 4/1969 Krantz, Jr. ......... A41D 13/1146 128/863
11,019,859 B1 * 6/2021 Rothenberg ....... A41D 13/1107
2018/0018951 A1 * 1/2018 Hsueh .................. G10K 11/161
2022/0047011 A1 * 2/2022 Rothenberg ......... G10K 11/162

FOREIGN PATENT DOCUMENTS

CN 110364137 A * 10/2019
DE 102017003617 A1 * 10/2018
DE 202020005088 U1 * 2/2021
KR 20120033366 A * 4/2012

* cited by examiner

*Primary Examiner* — Jeremy A Luks
(74) *Attorney, Agent, or Firm* — Schmeiser, Olsen & Watts LLP

(57) ABSTRACT

Methods and apparatus for a sound reducing mask wearable by a user according to various embodiments may include a body portion contoured to form a seal with the user's face when the body portion is placed over the user's mouth. The sound reducing mask may also include an air intake assembly including an inlet and a unidirectional flap configured to move between an open position and a closed position. Methods and apparatus for a sound reducing mask may further include a muffler configured to muffle noise made by the user.

14 Claims, 4 Drawing Sheets

METHODS AND APPARATUS FOR A SOUND REDUCING MASK

CROSS REFERENCE TO RELATED APPLICATION(S)

This application claims the benefit of U.S. Provisional Patent Application Ser. No. 63/237,817, filed on Aug. 27, 2021, and incorporates the disclosure of the application in its entirety by reference.

BACKGROUND OF THE INVENTION

In various environments, such as in shared-space environments, a person may behave in a manner that may disturb and/or irritate others. For example, a person, such as a child, may shout and cry when upset. Accordingly, nearby persons may be disturbed and/or irritated, especially in a crowded shared-space environment. In cases such as this, a mask may be placed over the person's mouth to reduce the sound generated by the person.

A conventional sound reducing mask generally covers the person's mouth and nose and contains two orifices to allow the person to breathe through his or her nose. The orifices, however, are generally small and therefore restrict airflow to the mask. Accordingly, a conventional sound reducing mask may cause the person wearing the mask to have difficulty breathing. In addition, a conventional sound reducing mask may be made of rubber, making the mask heavy and uncomfortable to wear.

Conventional sound reducing masks have not sufficiently addressed the need to eliminate noise so that a person wearing a mask can shout and/or cry without disturbing nearby persons while providing the person wearing the mask with sufficient airflow and comfort.

SUMMARY OF THE TECHNOLOGY

Methods and apparatus for a sound reducing mask wearable by a user according to various embodiments may comprise a body portion contoured to form a seal with the user's face when the body portion is placed over the user's mouth. The sound reducing mask may also comprise an air intake assembly comprising an inlet and a unidirectional flap configured to move between an open position and a closed position. Methods and apparatus for a sound reducing mask may further comprise a muffler configured to muffle noise made by the user.

BRIEF DESCRIPTION OF THE DRAWINGS

A more complete understanding of the subject technology may be derived by referring to the detailed description when considered in connection with the following illustrative figures. In the following figures, like reference numbers refer to similar elements and steps throughout the figures.

DETAILED DESCRIPTION OF EMBODIMENTS

The subject technology may be described in terms of functional components. Such functional components may be realized by any number of components configured to perform the specified functions and achieve the various results. For example, the subject technology may employ various air intake assemblies, flaps, inlets, sound-absorbing materials, mufflers, ear straps, headgear, headstraps, headbands, and the like, which may carry out a variety of functions. In addition, the subject technology may be practiced in conjunction with any one of various sound reducing systems, and the sound reducing mask described herein is merely one exemplary application for the technology.

Figure 1:
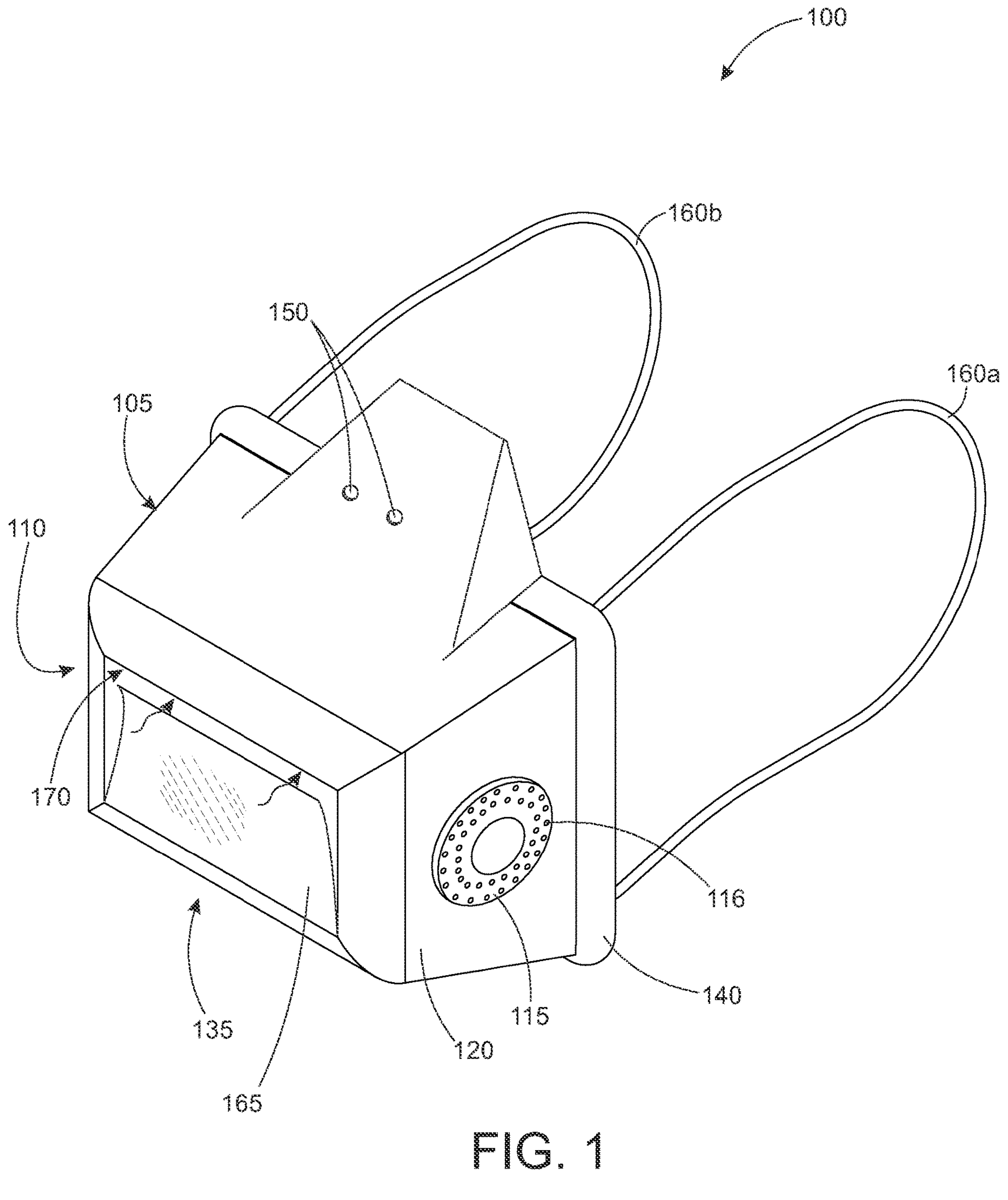
FIG. 1 representatively illustrates a front perspective view of a sound reducing mask in accordance with an embodiment of the subject technology.
Figure 2:
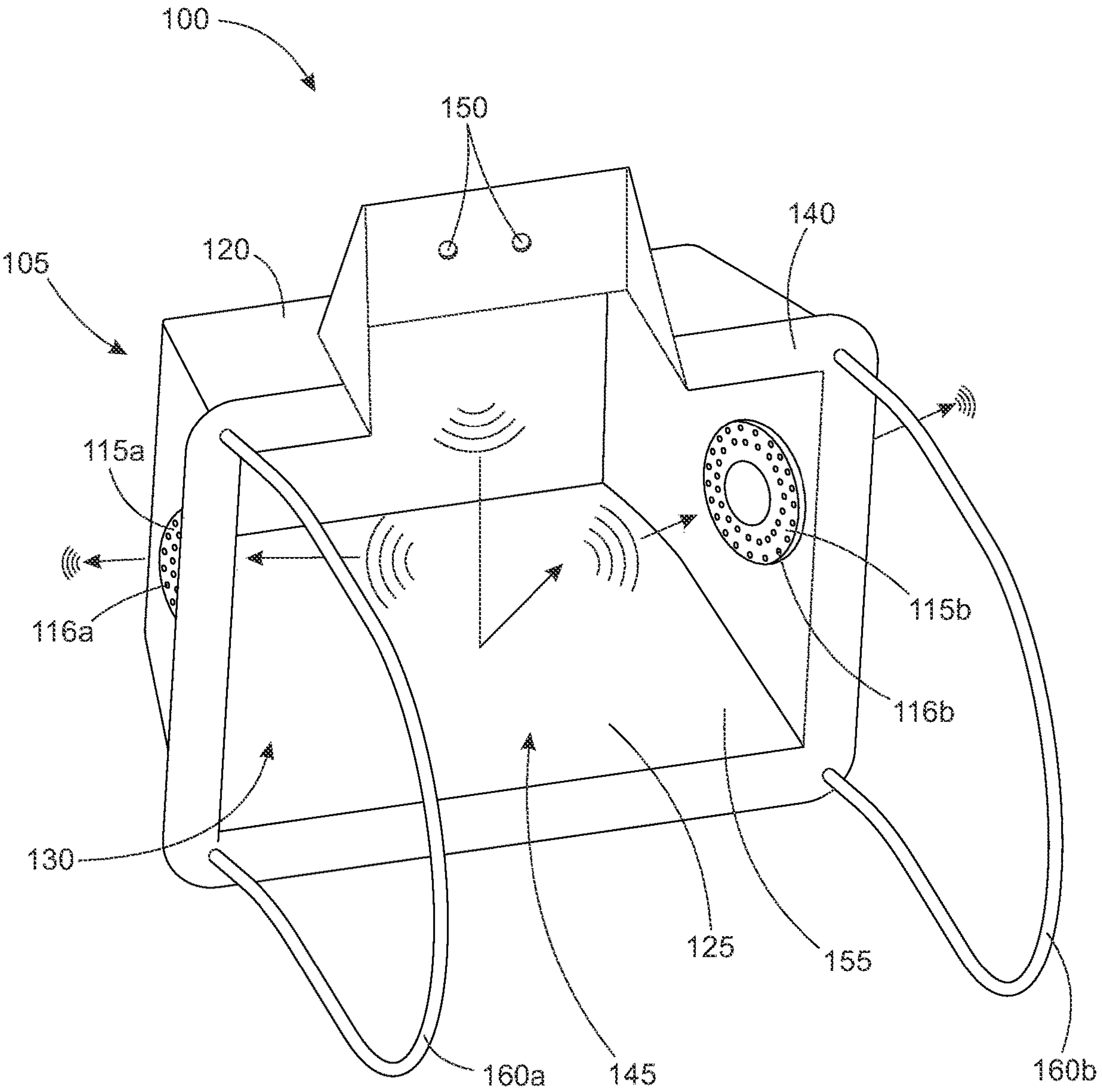
FIG. 2 representatively illustrates a rear perspective view of the sound reducing mask illustrated in FIG. 1.
Figure 3:
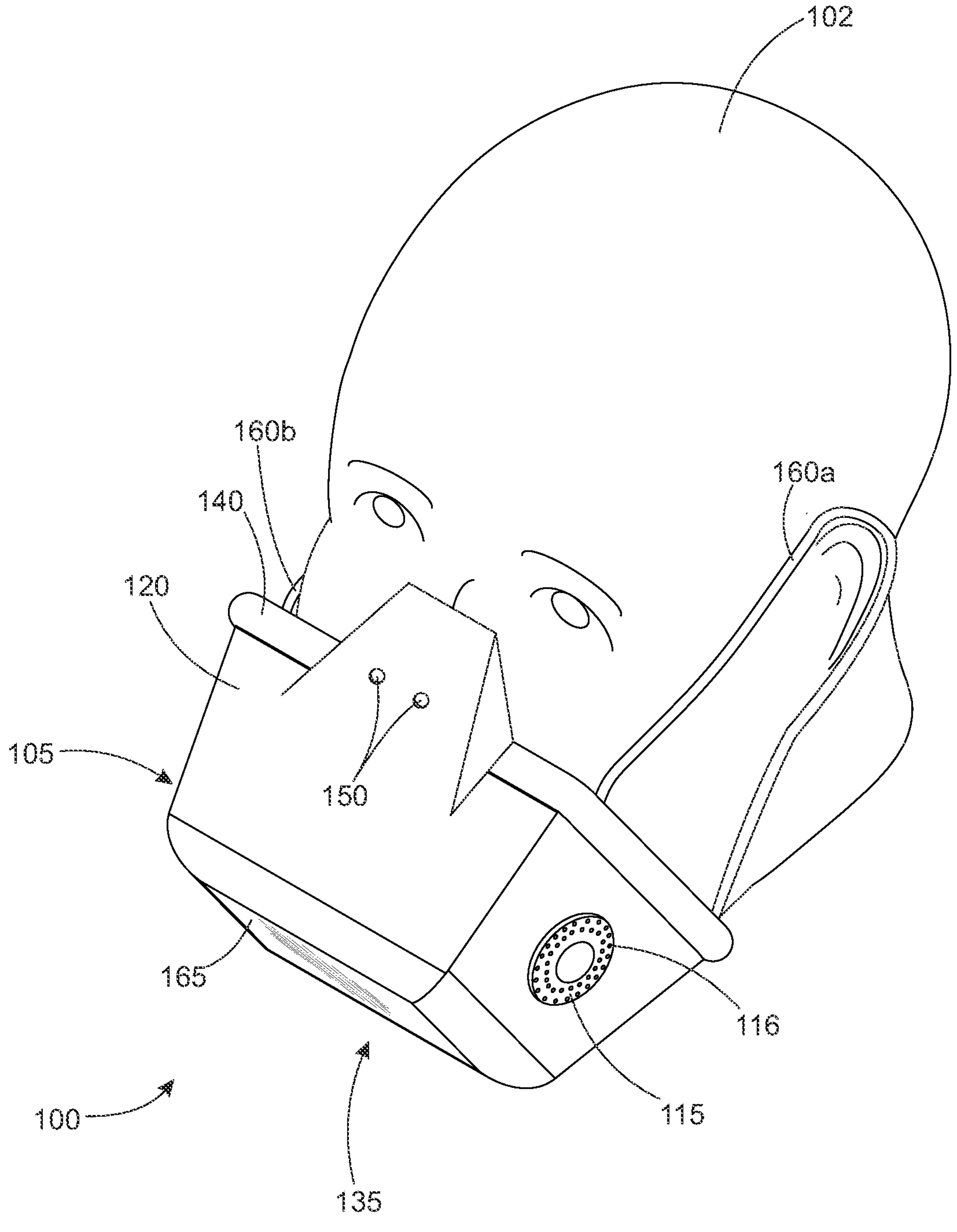
FIG. 3 representatively illustrates a sound reducing mask positioned for use in accordance with an embodiment of the subject technology.
Figure 4:
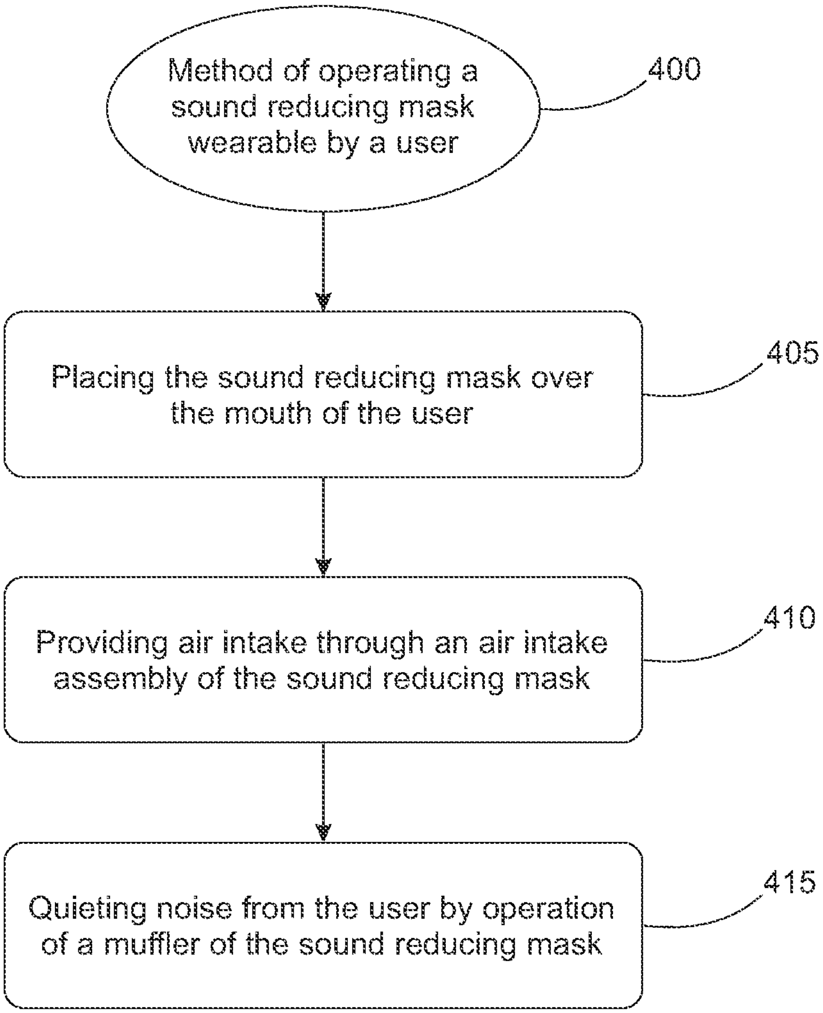
FIG. 4 representatively illustrates a flow diagram for operating a sound reducing mask in accordance with an embodiment of the subject technology.

Referring to FIGS. 1-3, an exemplary sound reducing mask 100 may be worn by a user 102, such as a child or baby. The sound reducing mask 100 may be placed over at least the mouth of the user 102 so that the user 102 may shout and/or cry in an environment without disturbing nearby persons. As generally used herein, and although not limited thereto, an "environment" is any type of shared-space environment, such as an aircraft cabin, a train cabin, a library, and the like. Furthermore, the user 102 does not necessarily have to be a child or baby. The sound reducing mask 100 may comprise a body portion 105, an air intake assembly 110, and a muffler 115.

The body portion 105 may be contoured to form a seal with the face of the user 102 when the body portion 105 is placed over the mouth of the user 102. According to various embodiments, the body portion 105 may comprise an exterior surface 120 and an interior surface 125. The body portion 105 may also comprise an open proximal end 130 and a distal end 135 opposite the proximal end 130. The open proximal end 130 may terminate in a peripheral brim 140 that forms an effective seal with the face of the user 102 when the body portion 105 is placed over the mouth of the user 102. The interior surface 125 of the body portion 105 may define a receptacle cavity 145 for receiving the mouth of the user 102. In some embodiments, the body portion 105 may further comprise one or more orifices 150 to allow the user 102 to breathe through his or her nose. Each orifice 150 may comprise any suitable diameter. For example, in one embodiment, each orifice 150 may comprise a diameter between about 0.05 inches and about 0.1 inches.

According to various embodiments, the body portion 105 may comprise a sound-absorbing layer 155 for absorbing sound emitted by the user 102. The sound-absorbing layer 155 may be constructed from any suitable sound-absorbing material, such as silicone, polyurethane foam, vinyl, cotton, mat, or felt, or a combination thereof. The sound-absorbing layer 155 may be capable of absorbing between about 20 decibels and about 30 decibels of noise. The sound-absorbing material may be selected according to its particular application. For instance, the sound-absorbing material may be selected according to its acoustic impedance value.

As an example, in the case where the sound-absorbing material comprises a low-impedance porous material, the porous material may absorb high-frequency (i.e., small wavelength) sound waves more effectively than low-frequency (i.e., large wavelength) sound waves. Alternatively, in the case where the sound-absorbing material comprises a high-impedance porous material, the porous material may absorb low-frequency (i.e., large wavelength) sound waves more effectively than high-frequency (i.e., small wavelength) sound waves. As generally used herein, high-frequency sound waves are sound waves with frequencies greater than or equal to 500 Hz, and low-frequency sound waves are sound waves with frequencies below 500 Hz.

According to various embodiments, the body portion 105 may comprise at least one of an ear strap, headgear, head-strap, or headband for securely attaching the sound reducing mask 100 to the face of the user 102. For example, in one embodiment, the body portion 105 may comprise a first strap 160*a* and a second strap 160*b*. Each strap 160*a*, 160*b* may be adjustable to provide a more comfortable or customizable fit around and/or over the ears of the user 102. The first and second straps 160*a*, 160*b* may be made of a comfortable material or fabric intended to be in prolonged contact with the ears of the user 102, such as polyester, nylon, silk, cotton, wool, linen, and the like.

In an alternative embodiment, the first and second straps 160*a*, 160*b* may instead comprise a single pliable strip of material that provides enough stretch or elasticity to fit a variety of head sizes. The pliable strip may comprise a stretchy material and may be sewn into or otherwise attached to a portion of the sound reducing mask 100 that will be in contact with the ears and/or head of the user 102 during use. The stretchy material may comprise any suitable material or fabric such as: elastic fabric, elastane, microfibers, nylon, polyester, stretchy mesh fabric, cotton, wool, or any combination thereof.

In some embodiments, the air intake assembly 110 may be positioned at the distal end 135 opposite the mouth of the user 102. The air intake assembly 110 may comprise a unidirectional flap 165 and an air inlet 170. The unidirectional flap 165 may be configured to move, relative to the body portion 105, between an open position, as shown in FIG. 1, and a closed position, as shown in FIG. 3. The unidirectional flap 165 may move between the open position and the closed position according to the internal pressure of the receptacle cavity 145. For example, the default position of the unidirectional flap 165 may be the closed position, but the unidirectional flap 165 may move to the open position when a negative pressure is induced inside the receptacle cavity 145. A negative pressure may be induced inside the receptacle cavity 145 when the user 102 inhales. Accordingly, air may be drawn into the mask 100 via the inlet 170 when the unidirectional flap 165 is in the open position. The unidirectional flap 165 may return to the closed position when a positive pressure is induced inside the receptacle cavity 145. A positive pressure may be induced inside the receptacle cavity 145 after the air is drawn into the mask 100 or when the user 102 exhales, screams, or shouts into the receptacle cavity 145.

It will be appreciated that modifications may be made to the air intake assembly 110 without departing from the scope of the invention. For example, the air intake assembly 110 as shown in FIGS. 1-3 may instead comprise a plurality of perforations (not shown). The perforations may be small enough so that the user 102 may make a variety of vocal sounds without being heard by nearby persons but not so small that the user 102 may have trouble breathing.

The muffler 115 may be configured to muffle noise made by the user 102. The mask 100 may comprise one or more mufflers. For example, in one embodiment, the mask 100 may comprise a first muffler 115*a* and a second muffler 115*b*, such as shown in FIG. 2. Each muffler 115*a*, 115*b* may be configured to muffle noise made by the user 102 so that the user 102 may make a variety of vocal sounds without being heard by nearby persons. Each muffler 115*a*, 115*b* may be disposed partially within the receptacle cavity 145 and may protrude outwardly from the exterior surface 120 of the body portion 105. Each muffler 115*a*, 115*b* may comprise any suitable muffler, such as a perforated muffler, and the like. As an example, in the case where the first and second mufflers 115*a*, 115*b* are perforated mufflers, the first muffler 115*a* may comprise a first plurality of perforations 116*a* and the second muffler 115*b* may comprise a second plurality of perforations 116*b*.

In operation, and referring now to FIGS. 1-4, a method of operating the sound reducing mask 100 (400) may comprise placing the mask over the mouth, nose, and/or chin of the user 102 (405). The sound reducing mask 100 may be placed over the mouth, nose, and/or chin of the user 102 by fitting the sound reducing mask 100 to the face of the user 102. The sound reducing mask 100 may be fitted to the face of the user 102 by placing the first and second straps 160*a*, 160*b* around the ears of the user 102.

Once the sound reducing mask 100 is fitted over the mouth, nose, and/or chin of the user 102, the method of operating the sound reducing mask 100 may also comprise providing air intake through the air intake assembly 110 of the mask 100 (410). Providing the air intake may comprise moving the unidirectional flap 165 from the closed position to the open position when the user 102 inhales. As the user inhales, a negative pressure may be induced inside the receptacle cavity 145, thereby causing the unidirectional flap 165 to move to the open position. Once the unidirectional flap 165 is in the open position, air may be drawn into the receptacle cavity 145 via the air inlet 170. After the air is drawn into the receptacle cavity 145, the unidirectional flap 165 may be moved to the closed position.

The method of operating the sound reducing mask 100 may further comprise quieting noise from the user 102 by operation of the muffler 115. In the event the user 102 shouts, screams, or cries, the resulting sound waves may travel into the receptacle cavity 145. Once the sound waves reach the interior surface 125 of the body portion 105, some of the sound waves may be absorbed by the sound-absorbing layer 155 while others may instead be reflected by the sound-absorbing layer 155. As discussed in paragraph of the present Application, the sound-absorbing layer 155 may absorb certain sound waves while reflecting others. Accordingly, sound waves that are reflected by the sound-absorbing layer 155 may be transmitted to each muffler 115*a*, 115*b* where they may be muffled before entering the outside air via perforations 115*a*, 115*b*, respectively.

The particular implementations shown and described are illustrative of the technology and its best mode and are not intended to otherwise limit the scope of the subject technology in any way. Indeed, for the sake of brevity, conventional manufacturing, connection, preparation, and other functional aspects of the apparatus may not be described in detail. Furthermore, the connections and points of contact shown in the various figures are intended to represent exemplary physical relationships between the various elements. Many alternative or additional functional relationships or physical connections may be present in a practical system.

In the foregoing description, the technology has been described with reference to specific exemplary embodiments. Various modifications and changes may be made, however, without departing from the scope of the subject technology as set forth. The description and figures are to be regarded in an illustrative manner, rather than a restrictive one and all such modifications are intended to be included within the scope of the subject technology. Accordingly, the scope of the technology should be determined by the generic embodiments described and their legal equivalents rather than by merely the specific examples described above. For example, the components and/or elements recited in any apparatus embodiment may be combined in a variety of permutations to produce substantially the same result as the subject technology and are accordingly not limited to the specific configuration recited in the specific examples.

Benefits, other advantages, and solutions to problems have been described above with regard to particular embodiments. Any benefit, advantage, solution to problems or any element that may cause any particular benefit, advantage, or solution to occur or to become more pronounced, however, is not to be construed as a critical, required, or essential feature or component.

The terms "comprises," "comprising," or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the subject technology, in addition to those not specifically recited, may be varied, or otherwise particularly adapted to specific environments, manufacturing specifications, design parameters or other operating requirements without departing from the general principles of the same.

The subject technology has been described above with reference to an exemplary embodiment. However, changes and modifications may be made to the exemplary embodiment without departing from the scope of the subject technology. These and other changes or modifications are intended to be included within the scope of the subject technology.

The invention claimed is:

1. A sound reducing mask wearable by a user, comprising:
- a body portion contoured to form a seal with the user's face when the body portion is placed over the user's mouth;
- an air intake assembly, comprising:
  - an inlet; and
  - a unidirectional flap configured to move between an open position and a closed position; and
- at least one muffler provided in the body portion and configured to muffle noise made by the user, wherein the at least one muffler protrudes outwardly from an exterior surface of the body portion and wherein the at least one muffler comprises perforations.

2. The mask of claim 1, wherein the unidirectional flap moves from the closed position to the open position when the user inhales, and wherein:
- air is drawn into the mask via the inlet when the unidirectional flap is in the open position; and
- the unidirectional flap returns to the closed position after the air is drawn into the mask.

3. The mask of claim 1, wherein the body portion comprises at least one of an ear strap, headgear, headstrap, or headband.

4. The mask of claim 1, wherein the body portion comprises a sound-absorbing material.

5. The mask of claim 4, wherein the sound-absorbing material comprises silicone, polyurethane foam, vinyl, cotton, mat, felt, or a combination thereof.

6. The mask of claim 4, wherein the sound-absorbing material is capable of absorbing between about 20 decibels and about 30 decibels of noise.

7. The mask of claim 1, wherein the at least one muffler is a first muffler and a second muffler on opposing sidewalls of the body portion.

8. The mask of claim 1, wherein the at least one muffler is disposed partially within a receptacle cavity of the body portion.

9. A method of operating a sound reducing mask wearable by a user, comprising:
- providing a mask with a body portion;
- placing the body portion of the mask over the mouth of the user;
- providing air intake through an air intake assembly provided in the mask;
- providing at least one muffler in the body portion of the mask; and
- quieting noise from the user by operation of the at least one muffler of the mask,
  - wherein the at least one muffler protrudes outwardly from an exterior surface of the body portion and wherein the at least one muffler comprises perforations.

10. The method of claim 9, wherein placing the mask over the mouth of the user comprises securing the mask over the mouth of the user using at least one of an earstrap, headgear, headstrap, or headband.

11. The method of claim 9, wherein providing the air intake through the air intake assembly of the mask comprises:
- moving a unidirectional flap of the air intake assembly from a closed position to an open position when the user inhales;
- drawing air into the mask when the unidirectional flap is in the open position; and
- returning the unidirectional flap to the closed position after the air is drawn into the mask.

12. The method of claim 9, further comprising quieting the noise from the user by using a sound-absorbing material of the mask to muffle the noise.

13. The method of claim 12, wherein the sound-absorbing material comprises silicone, polyurethane foam, vinyl, cotton, mat, felt, or a combination thereof.

14. The method of claim 12, wherein the sound-absorbing material is capable of absorbing between about 20 decibels and about 30 decibels of noise.

* * * * *